United States Patent [19]

Shiraishi et al.

[11] Patent Number: 4,576,474

[45] Date of Patent: Mar. 18, 1986

[54] INFORMATION INPUT/OUTPUT APPARATUS FOR DISK FILM

[75] Inventors: Atsushi Shiraishi; Mizuho Nishimura, both of Kanagawa, Japan

[73] Assignee: Fuji Photo Film Co., Ltd., Kanagawa, Japan

[21] Appl. No.: 669,718

[22] Filed: Nov. 9, 1984

[30] Foreign Application Priority Data

Nov. 28, 1983 [JP]  Japan ................................ 58-223755
Nov. 28, 1983 [JP]  Japan ................................ 58-223756
Nov. 28, 1983 [JP]  Japan ................................ 58-223757

[51] Int. Cl.⁴ ............................................. G03B 27/62
[52] U.S. Cl. ........................................ 355/75; 355/46
[58] Field of Search ............................. 355/46, 75, 76

[56] References Cited

U.S. PATENT DOCUMENTS

4,203,664  5/1980  Clifton et al. .......................... 355/75
4,204,733  5/1980  Modney et al. ......................... 355/76
4,392,743  7/1983  Anderson .............................. 355/75

Primary Examiner—Monroe H. Hayes
Attorney, Agent, or Firm—Sughrue, Mion, Zinn, Macpeak and Seas

[57] ABSTRACT

An information input/output apparatus for a disk film effects inputting and outputting of information in relation to the disk film in which a film disk is attached around a hub. The apparatus is provided with a hollow moving table on which the peripheral edge of the disk film is mounted. The moving table is adapted to be movable to various stations successively. Accordingly, in the inspection station, it is possible to simultaneously project a multiplicity of image frames on the disk film, thereby allowing a highly efficient information input-/output operation.

34 Claims, 7 Drawing Figures

INFORMATION INPUT/OUTPUT APPARATUS FOR DISK FILM

BACKGROUND OF THE INVENTION

1. Field of the Invention

The present invention relates to an information input/output apparatus for a disk film which effects inputting and outputting of information in relation to the recording portion of a disk film.

2. Description of the Prior Art

A disk film has been employed in which a film disk is attached around a hub, and a plurality of image frames are annularly provided on the film disk.

One example of this type of disk film is shown in the specification of International Application No. PCT/US79/00566. On the other hand, examples of an information processing apparatus which effects inputting and outputting of information in relation to such disk film are shown in the specifications of Japanese Patent Laid-Open No. 22,799/1980 and U.S. Pat. No. 4,203,664.

The conventional information input/output apparatus for a disk film has been arranged such that a rotating shaft is inserted into a hub bore in the disk film, and the disk film is rotated by the rotation of the rotating shaft when information is input or output.

In such conventional information input/output apparatus, however, when image frames are projected on a screen in an inspection station annexed to the information input/output apparatus in order to allow inspection of the image frames, it is necessary to project single image frames on the screen, one at a time, while rotating the disk film in the information input/output apparatus. In consequence, much time is required for inspection, which disadvantageously hinders speedy operation.

SUMMARY OF THE INVENTION

In view of the above-described fact, it is a primary object of the present invention to provide an information input/output apparatus for a disk film which is capable of projecting a plurality of image frames at one time without any need for rotating the disk film.

To this end, according to the present invention, there is provided an information input/output apparatus for a disk film in which a hollow moving table is provided, and the peripheral edge of the disk film is mounted on the moving table and is retained on the moving table by a retainer means, and further, the moving table is moved to a predetermined station by a driving means, thereby allowing a plurality of image frames on the disk film to be simultaneously projected through a hollow portion of the moving table.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
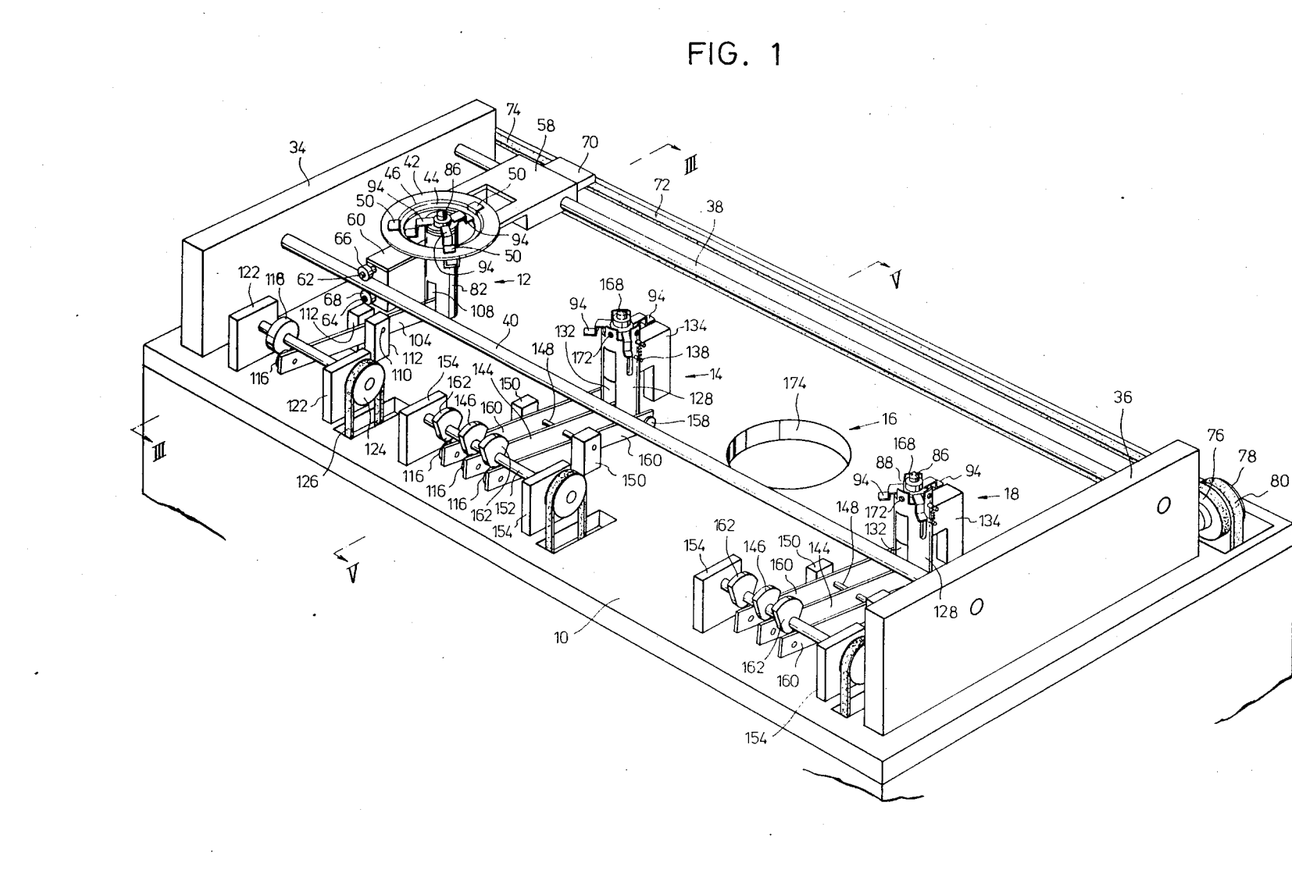
FIG. 1 is a perspective view of one embodiment of the information input/output apparatus for a disk film in accordance with the present invention.

Referring first to FIG. 1 which shows an information input/output apparatus for a disk film in accordance with one embodiment of the present invention, a plurality of operation stations are linearly disposed on a base plate 10. These operation stations include a film supply station 12, an information processing station 14, an inspection station 16, and a film take-out station 18.

Figure 2:
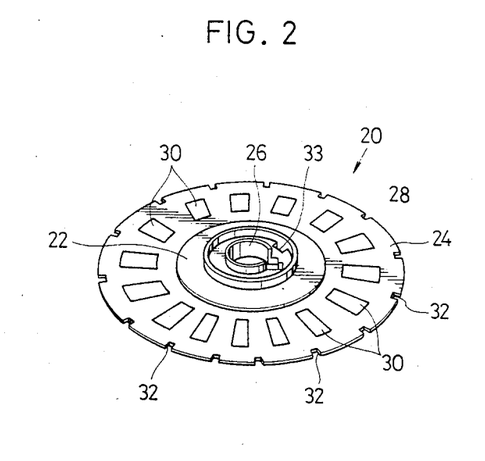
FIG. 2 is a perspective view of a disk film employed in the embodiment.

FIG. 2 shows a disk film 20 employed in the information input/output apparatus. The disk film 20 is arranged such that an orbicular film disk 24 is attached around a hub 22, and the hub 22 has a hub bore 26 extending through its central axis. A key groove 28 is formed such as to extend from the inner peripheral surface of the hub bore 26. The key groove 28 has an L shape in plan view. The key groove 28 makes it possible to discriminate between the face and back of the disk film 20.

The film disk 24 is made of a material similar to that for a generally employed belt-shaped film. The film disk 24 is adapted to be formed with a plurality (fifteen, in this embodiment) of image frames 30 around the hub 22. The film disk 24 is further formed on the outer periphery thereof with rectangular positioning recesses 32 each corresponding to an intermediate position between the adjacent image frames 30.

Further, a rectangular bore 33 is formed in a portion of the hub 22, according to need, such that an engagement pin of another device can be inserted into the rectangular bore 33.

On the base plate 10 stands a pair of brackets 34, 36, between which the above-described four stations are disposed. Between the brackets 34, 36, a pair of parallel guide bars 38, 40 are stretched such as to be parallel to each other with a predetermined spacing therebetween. The guide bars 38, 40 are adapted to guide a moving table 42 such that the latter is movable from the film supply station 12 to the film take-out station 18.

The moving table 42 will be explained hereinunder in detail.

Figure 3:
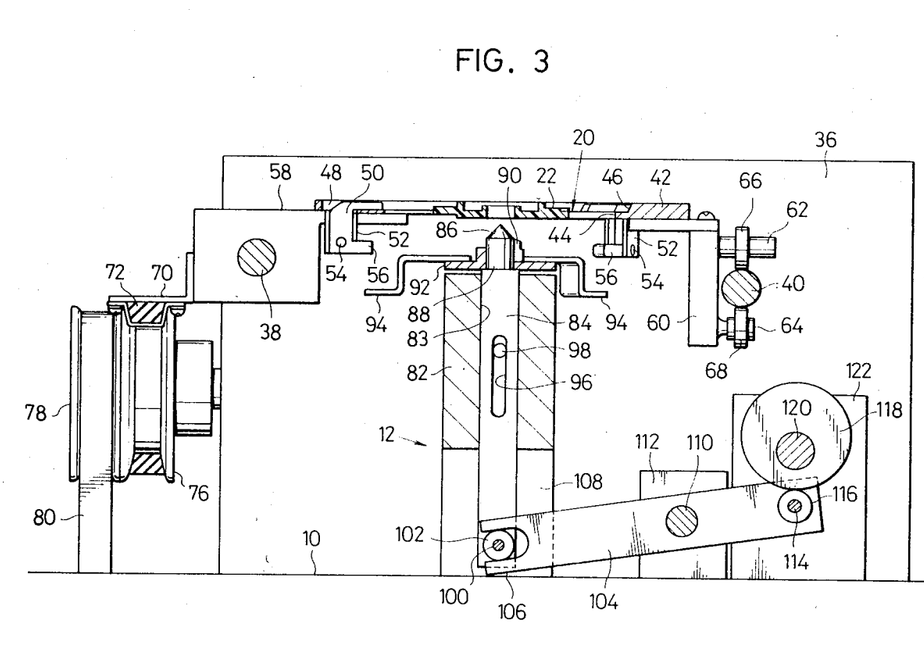
FIG. 3 is a sectional view taken along the line III—III of FIG. 1, showing a film supply station.

As also shown in FIG. 3, the moving table 42 consists of a thin disk which has a hollow circular bore 44 formed in the central portion thereof. The portion of the moving table 42 in the vicinity of the hollow circular bore 44 consists of a thin-walled portion. A taper portion 46 is formed such as to extend from the outer periphery of the thin-walled portion and such as to gradually increase in wall thickness toward the outer periphery side of the moving table 42. The taper portion 46 serves as a guide surface for guiding the disk film 20 when it is mounted on the moving table 42. When the disk film 20 is mounted on the moving table 42, the outer periphery of the film disk 24 is mounted on the thin-walled portion at the peripheral edge of the hollow circular bore 44.

The moving table 42 has three rectangular bores 48 formed around the central axis thereof at equal spacings. Retainer pawls 50 are respectively received in the rectangular bores 48. Each of the retainer pawls 50 is pivotally attached through a pin 54 to a bracket 52 projecting from the bottom surface of the moving table 42. The retainer pawls 50 have their respective upper end portions corresponding to the thin-walled portion at the peripheral edge of the hollow circular bore 44 and are adapted to clamp the peripheral edge portion of the disk film 20 mounted on the moving table 42 between the same and the moving table 42 by the use of the urging force of a torsion coiled spring (not shown) interposed between each retainer pawl 50 and the associated bracket 52, thereby retaining the disk film 20 on the moving table 42. Since the retainer pawls 50 retain the peripheral edge portion of the disk film 20, the respective retaining portions of the retainer pawls 50 are adapted not to interfere with the image frames 30 of the disk film 20.

Further, the lower end portion of each retainer pawl 50 is extended toward the axial center of the moving table 42 such as to form a force-receiving arm 56. The arrangement is such that the retainer pawls 50 are pivoted as the respective force-receiving arms 56 receive pivoting force, thereby cancelling the retention of the disk film 20. The retainer pawls 50 may be arranged such as to maintain the state shown in FIG. 3 by virtue of their own weight in order to clamp the disk film 20.

A bracket 58 is secured to a portion of the outer periphery of the moving table 42. The bracket 58 is pierced by the guide bar 38. Moreover, a bracket 60 is secured to another portion of the outer periphery of the moving table 42. Rollers 66, 68 are rotatably supported by a pair of parallel pins 62, 64, respectively, which project from the bracket 60. These rollers 66, 68 are respectively in contact with the opposite sides of the guide bar 40 such as to clamp the same.

Thus, the brackets 58, 60 allow the moving table 42 to slide along the guide bars 38, 40 such as to move to each station.

To the bracket 58 is secured one of the ends of an L-shaped bracket 70, the lower end of which is attached to a portion of an endless belt 72. The endless belt 72 is passed over pulleys 74, 76 which are rotatably supported by respective brackets 34, 36. The endless belt 72 is linearly stretched between these pulleys 74, 76.

To the pulley 76 is secured a pulley 78, over which a belt 80 is passed. The belt 80 is adapted to reciprocatively rotate at a predetermined number of revolutions by the driving force of a motor, not shown. Thus, the endless belt 72 is reciprocatively rotated, and therefore, the moving table 42 is able to move to any desired station between the film supply station 12 and the film take-out station 18.

The film supply station 12 will now be explained with reference to FIG. 3.

In the film supply station 12, a cylindrical member 82 is stood on the base plate 10 such that the axis of the cylindrical member 82 is vertical. An elevating shaft 84 is received in a hollow bore 83 formed in the axial center of the cylindrical member 82 such as to be vertically movable. A cone 86 is formed on the upper end portion of the elevating shaft 84. The lower portion of the cone 86 is adapted to serve as an insertion shaft 88 which is inserted into the hub bore 26 of the disk film 20 as it is retained on the moving table 42. The insertion shaft 88 is provided with a key 90 which corresponds to the key groove 28 on the disk film 20. The key 90 also has a cross-section of an L shape as viewed in the axial direction of the insertion shaft 88 so as to coincide with the key groove 28.

To the lower portion of the insertion shaft 88 is secured a disk 92, to which three leaf springs 94 are secured. These leaf springs 94 have their respective distal end portions formed in the shape of an L as shown in FIG. 3 and radially project from the insertion shaft 88 such as to correspond to the respective force-receiving arms 56 of the moving table 42.

Figure 4:
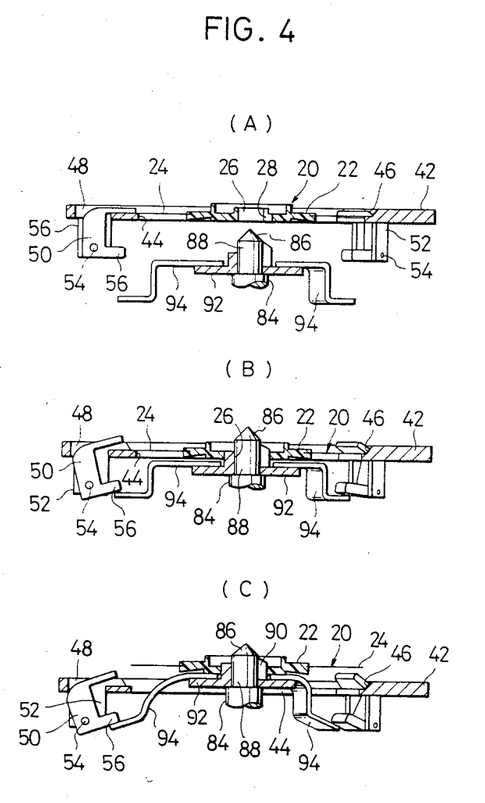
FIG. 4 is an illustration showing how the disk film mounted on a moving table is moved.

As shown in FIG. 4(B), after the insertion shaft 88 has been inserted into the hub bore 26 and before the disk film 20 is raised, the leaf springs 94 abut against the corresponding force-receiving arms 56 such as to pivot the associated retainer pawls 50, thereby cancelling the retention of the disk film 20. Accordingly, the arrangement is such that, as the insertion shaft 88 is further raised, as shown in FIG. 4(C), the disk film 20 is raised from the moving table 42 without interfering with the retainer pawls 50. In this case, the leaf springs 94 are deflected by virtue of their resilience, thereby absorbing any overstroke of the insertion shaft 88.

As the overstroke absorbing means, various lost-motion means are applicable which prevent the retainer pawls 50 from being further pivoted regardless of any further rise of the insertion shaft 88, in addition to a means which makes use of deflection of a resilient member, such as that described above.

The elevating shaft 84 is formed in its intermediate portion with a slot 96, through which a pin 98 is received. Both end portions of the pin 98 are secured to the cylindrical member 82. Thus, the elevating shaft 84 is guided by the pin 98 such as to be vertically movable by a stroke which corresponds to the longitudinal length of the slot 96.

A roller 102 is rotatably supported by a pin 100 at the lower end portion of the elevating shaft 84. The roller 102 is received in a yoke 106 which is formed at the distal end portion of a lever 104. The lever 104 has one of the end portions thereof received through a through-hole 108 which is formed in the lower end portion of the cylindrical member 82 such as to extend in a radial direction passing through the central axis of the cylindrical member 82. The lever 104 has a pin 110 piercing through an intermediate portion thereof. The pin 110 is rotatably supported by a bracket 112 mounted to the base plate 10.

Further, a roller 116 is rotatably supported by a pin 114 at the other end portion of the lever 104 such as to be in contact with the outer periphery of a cam 118. The cam 118 is an eccentric cam which is secured to a shaft 120. The shaft 120 is rotatably supported by a bracket 122 mounted to the base plate 10. Further, the shaft 120 has a pulley 124 secured to the distal end thereof (see FIG. 1). A belt 126 is passed over the pulley 124. The belt 126 is adapted to rotate the shaft 120 by receiving the rotational force of a motor (not shown) which is disposed on the lower side of the base plate 10. Thus, as the cam 118 rotates, the lever 104 is pivoted about the pin 110, causing the elevating shaft 84 to be raised.

It is to be noted that the elevating shaft 84 may be constantly subjected to a force urging it to its lowered position, and a switch, for example, may be provided for detecting the rotational angle of the shaft 120 so as to feed back the detected rotational angle to a controller.

Figure 6:
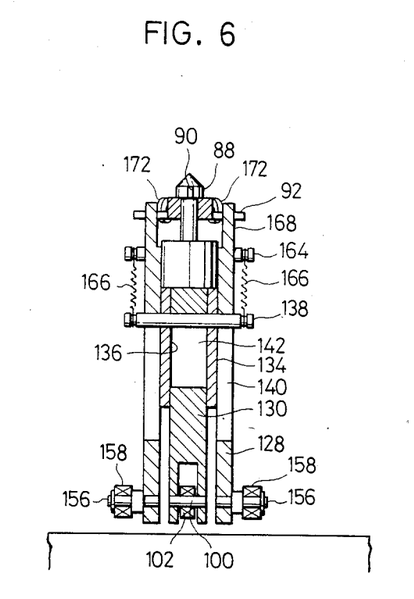
FIG. 6 is a sectional view taken along the line VI—VI of FIG. 5.
Figure 7:
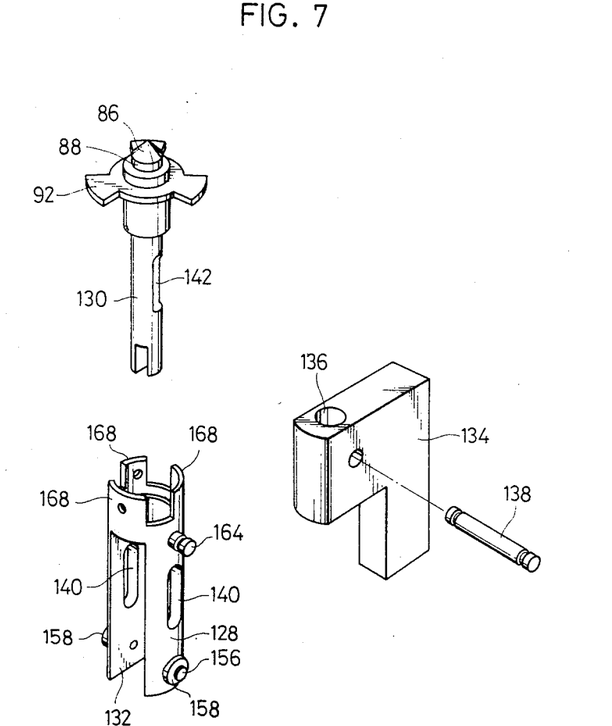
FIG. 7 is an exploded perspective view of an essential part of FIG. 6.

The information processing station 14 will be described hereinunder with reference to FIGS. 5 to 7.

The information processing station 14 is also provided with a cylindrical member 128 and an elevating shaft 130 similar to those in the film supply station 12. In the information processing staion 14, however, the cylindrical member 128 is also adapted to be vertically movable. More specifically, a large notch 132 is formed in the cylindrical member 128 such as to extend radially while passing through the central axis thereof. One of the ends of an L-shaped bracket 134 is received in the notch 132. The lower end of the L-shaped bracket 134 is secured to the base plate 10. The L-shaped bracket 134 has a circular bore 136 which extends therethrough coaxially with the cylindrical member 128. The elevating shaft 130 is received in the circular bore 136.

The L-shaped bracket 134 further has a pin 138 projecting therethrough in a direction orthogonal to the longitudinal axis of the circular bore 136. The intermediate portion of the pin 138 is received through both a slot 140 formed in the cylindrical member 128 and a slot 142 formed in the elevating shaft 130. Accordingly, the cylindrical member 128 and the elevating shaft 130 are able to move vertically while moving relative to the pin 138 by distances correponding to the respective longitudinal lengths of the slots 140, 142. In this case, the stroke provided by the slot 142 is shorter than that provided by the slot 140.

In a similar manner to the elevating shaft 84 in the film supply station 12, the elevating shaft 130 has the insertion shaft 88 and the disk 92 mounted on the upper portion thereof. The leaf spring 94 is attached to the disk 92. Further, the roller 102 is mounted by the pin 100 at the lower end portion of the elevating shaft 130. A lever 144 is provided with a yoke receiving the roller 102. The lever 144 is adapted to be pivoted by a cam 146 in a manner similar to that in the case of the film supply station 12. An intermediate portion of the lever 144 is pivotally supported by a bracket 150 through a pin 148. The cam 146 is secured to a shaft 152, which is rotatably supported by a bracket 154.

Further, a pair of rollers 158 are rotatably supported by a pair of pins 156 on both sides of the lower end portion of the cylindrical member 128. Levers 160 are provided such that one of the ends of each lever 160 connects to one of the rollers 158. Respective intermediate portions of the levers 160 are pivotally supported by the pin 148. In a manner similar to the lever 144, each lever 160 has a roller 116 which is mounted at the other end portion thereof such as to correspond to one of the cams 162. The cams 162 are secured to the shaft 152 and are adapted to rotate together with the cam 146.

Figure 5:
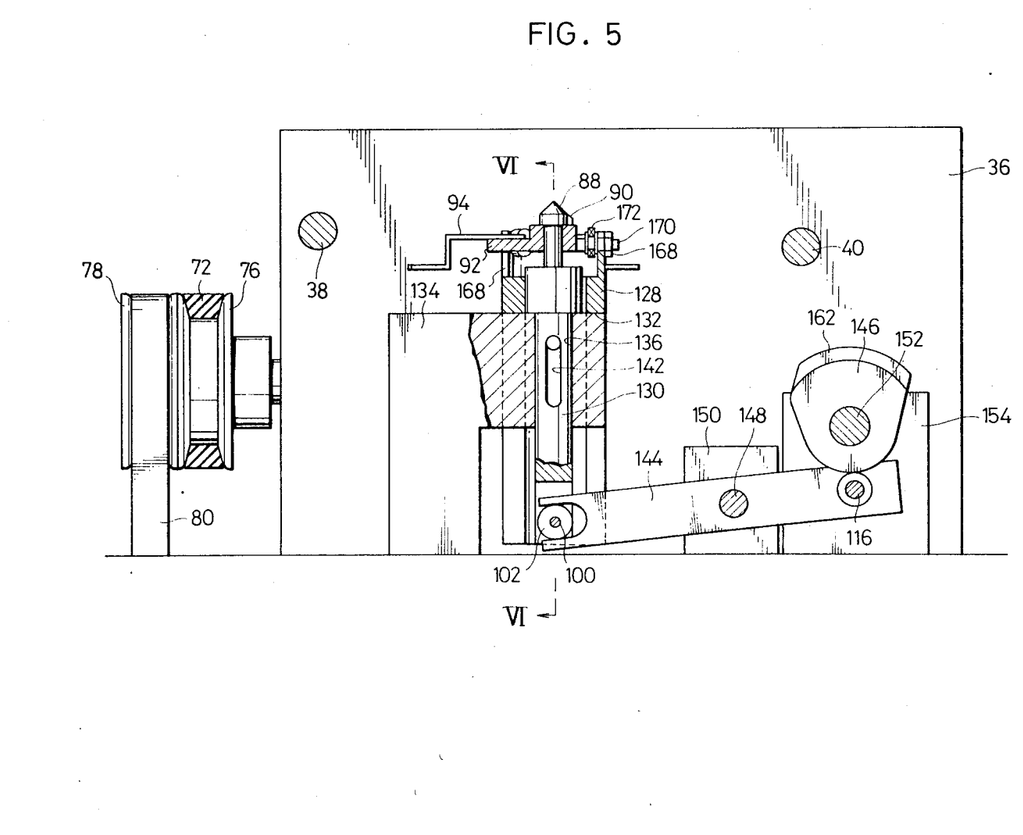
FIG. 5 is a sectional view taken along the line V—V of FIG. 1, showing an information processing station.

In this case, as clearly shown in FIG. 5, the lift of each of the cams 162 is made larger, from an intermediate portion thereof, than the lift of the cam 146. Thus, the arrangement is such that, although the cylindrical member 128 and the elevating shaft 130 are raised to the same height until the cams 162, 146 rotate to reach a predetermined rotational angle, the cylindrical member 128 is, thereafter, raised higher than the elevating shaft 130. In a manner similar to the cam 118 in the film supply station 12, the cams 146, 162 are rotated by the shaft 152 which receives driving force from a drive source (not shown), such as a motor, through a pulley 124 and a belt 126. The rotation of the shaft 152 may be detected and fed back to a controller.

It is to be noted that the pin 138 has a tension coiled spring 166 interposed between the same and a pin 164 projecting from the outer periphery of the cylindrical member 128, whereby the elevating shaft 130 is constantly urged to a lower position.

From the upper end portion of the cylindrical member 128, three projections 168 are upwardly extended. Each of the projections 168 is provided with a radially projecting pin 170, by which a bearing 172 is rotatably supported. The bearings 172 are arranged such that, when the cylindrical member 128 is raised higher than the elevating shaft 130, the bearings 172 push up the hub 22 of the disk film 20 such that the hub 22 is drawn out from the insertion shaft 88 permitting the transfer of the disk film 20 to a rotational drive device at an adjacent machine, which is disposed above the information processing station 14. The rotational drive device, not shown, is arranged such that a spindle having a conical receiving portion which coincides with the cone 86 of the elevating shaft 130 receives the disk film 20, and an engagement pin projecting from a portion of the spindle engages one of the rectangular bores 33 of the disk film 20, thereby allowing the disk film 20 to be rotated about its own axis.

In the inspection station 16 adjacent to the information processing station 14, a circular bore 174 is formed in the base plate 10. When the moving table 42 is moved to the inspection station 16, the light from a light-emitting means, not shown, passes through the image frames 30 from the lower side of the disk film 20 retained on the moving table 42, whereby it is possible to simultaneously project all the images of the image frames 30 onto a screen (not shown) disposed above the inspection station 14.

The film take-out station 18 has a construction similar to that of the information processing station 14. Therefore, the film take-out station 18 is provided with the cylindrical member 128, the elevating shaft, and so forth, which are vertically moved in a manner similar to that in the case of the information processing station 14. However, the film take-out station 18 is arranged such that a film take-out container is disposed above the station 18 as an adjacent device and the disk films 20 pushed up by the bearings 172 are successively housed in the container.

The following is a description of the operation of the above-described embodiment.

When the moving table 42 is disposed on the film supply station 12 as shown in FIG. 1, a disk film 20 is supplied from a disk film supply container (not shown) installed above the film supply station 12 such as to be mounted on the moving table 42.

Before the disk film 20 is mounted on the moving table 42, the elevating shaft 84 has already been raised by the rotation of the cam 118, and consequently, the retainer pawls 50 have already been moved properly, as shown in FIG. 4(C), so as not to interfere with the disk film 20 as it is mounted on the moving table 42.

When the disk film 20 has been mounted on the moving table 42, the elevating shaft 84 is lowered by the rotation of the cam 118. Therefore, as shown in FIGS. 4(B) and 4(A), after the disk film 20 has been mounted on the moving table 42, the retainer pawls 50 retain the disk film 20 on the moving table 42.

It is to be noted that the disk film 20 may be manually mounted on the moving table 10.

Next, the moving table 42 is moved to the information processing station 14 by the driving force of a motor, not shown. When the moving table 42 has been moved to the information processing station 14, the cylindrical member 128 and the elevating shaft 130 are raised by the rotation of the cams 162 and 146. Thus, in a similar manner to the elevating shaft 84 in the film supply station 12, the elevating shaft 130 causes the leaf springs 94 to pivot the corresponding retainer pawls 50 of the moving table 42, thereby cancelling the retention of the disk film 20.

Thereafter, the cylindrical member 128 is further raised such as to be higher than the elevating shaft 130 by the rotation of the cam 162. Consequently, the bearings 172 are raised, whereby the disk film 20 has its hub 22 drawn out from the insertion shaft 88 and is raised. As a result, the key groove 28 of the disk film 20 comes off the key 90, thereby allowing the disk film 20 to be rotatable about its own axis. Then, the disk film 20 is transferred to the drive device disposed above the information processing station 14 and is rotated on the bearings 172 by the drive device. During the rotation of the disk film 20, an input/output device, not shown, reads out the magnetic information recorded on the hub 22 or writes magnetic information into the hub 22. The magnetic information includes the number of prints to be produced by each of the image frames 30, the print conditions and so forth.

When the magnetic information input/output operation has been completed, the disk film 20 is returned to its initial rotational position. Then, the cylindrical member 128 and the elevating shaft 130 are lowered again by the rotation of the cams 162 and 146, whereby the disk film 20 is fitted on the elevating shaft 84, and the retainer pawls 50 retain the film disk 24 on the moving table 42.

Then, the moving table 42 is moved to the inspection station 16. In the inspection station 16, light is applied from the lower side of the circular bore 174, whereby all the image frames 30 of the disk film 20 are simultaneously projected onto the screen disposed above the inspection station 16. By so doing, an inspection operator is able to inspect all the image frames 30 at one time. In particular, in this inspection station 16, the disk film 20 is retained by the peripheral edge portion of the hollow circular bore 44; there is therefore no obstacle to the simultaneous projection of all the image frames 30.

When the operation at the inspection station 16 has been completed, the moving table 42 is moved back to the information processing station 14, where the information obtained at the inspection station 16 is recorded. The moving table 42 is further moved to the film take-out station 18. In the film take-out station 18, in a manner similar to the information processing station 14, the cylindrical member 128 and the elevating shaft 130 are raised, and the disk film 20 is raised together with the insertion shaft 88 after the retaining operation effected by the retainer pawls 50 has been cancelled. Then, the disk film 20 is drawn out from the insertion shaft 88 by the bearings 172 and is housed in the film take-out container disposed above the film take-out station 18, thus completing the transfer of the disk film 20.

Thereafter, the moving table 42 is returned back to the film supply station 12, where a subsequent film disk 20 is supplied to the moving table 42. It is possible to change, if necessary, the moving order of the moving table 42 to the stations as desired.

As has been described above, the information input/output apparatus for a disk film in accordance with the present invention is provided with: a hollow moving table on which the peripheral edge of a disk film is mounted; the retainer means which retains the peripheral edge of the disk film on the moving table; and the driving means which moves the moving table to a predetermined station. Thus, it advantageously becomes possible to simultaneously project all the image frames onto the screen when the disk film is subjected to a projecting operation.

What is claimed is:

1. An information input/output apparatus for a disk film used for effecting inputting and outputting of information in relation to the disk film in which a film disk is attached around a hub, said apparatus comprising:
    (a) a hollow moving table on which the peripheral edge of said disk film is mounted;
    (b) retainer means which retains the peripheral edge of said disk film on said moving table; and
    (c) guide means which moves said moving table to predetermined stations, whereby it is possible to simultaneously project all the image frames of said film disk in a projecting operation at a predetermined station.

2. An information input/output apparatus for a disk film according to claim 1, wherein said moving table consists of a disk which has a bore formed in the center thereof, said disk having a peripheral edge at said bore on which the peripheral edge of said disk film can be mounted.

3. An information input/output apparatus for a disk film according to claim 2, wherein said moving table is provided on the outer side of the peripheral edge at said bore with a taper portion which is gradually increased in wall thickness toward the outer peripheral side of said moving table such that said taper portion serves to guide the outer peripheral portion of said disk film as it is mounted thereon.

4. An information input/output apparatus for a disk film according to claim 1, wherein said retainer means is provided with a retainer pawl which is pivotally supported by said moving table, said retainer pawl having one of the ends thereof adapted to press against said moving table such that when the peripheral edge portion of said disk film is mounted on said moving table said peripheral edge portion of said disk film is clamped between said end and said moving table.

5. An information input/output apparatus for a disk film according to claim 4, further comprising cancelling means which is disposed at at least one of said stations to abut against and pivot said retainer pawl when rising, thereby cancelling the clamping of said disk film.

6. An information input/output apparatus for a disk film according to claim 5, further comprising means for further raising cancelling means after the clamping of said disk film is cancelled by pivoting said retainer pawl, to thereby allow raising of said disk film.

7. An information input/output apparatus for a disk film according to claim 6, further comprising means for preventing further pivoting of said retainer pawl by said cancelling means as it further rises after it has cancelled the clamping of said disk film by pivoting said retainer pawl.

8. An information input/output apparatus for a disk film according to claim 6, wherein said cancelling means has a resilient member interposed between the same and said retainer pawl, whereby, when said cancelling means rises more than a predetermined value, said retainer pawl is prevented from further pivoting by deflection of said resilient member.

9. An information input/output apparatus for a disk film according to claim 8, wherein said resilient member is a leaf spring.

10. An information input/output apparatus for a disk film according to claim 5, wherein said cancelling means is provided with an insertion shaft which raises said disk film after being inserted into a hub bore in said disk film.

11. An information input/output apparatus for a disk film according to claim 10, wherein the insertion shaft of said cancelling means is provided with a key projecting therefrom, said key being adapted to be inserted into a key groove which is provided on said disk film such as to communicate with said hub bore, in order to prevent rotation of said disk film as it is raised by said insertion shaft.

12. An information input/output apparatus for a disk film according to claim 5, further comprising lifting means which is disposed at at least one of said stations and is able to rise independently of said cancelling means such as to raise said disk film when rising.

13. An information input/output apparatus for a disk film according to claim 12, wherein said cancelling means and said lifting means are disposed coaxially with each other with said cancelling means positioned in the axial center of said lifting means.

14. An information input/output apparatus for a disk film according to claim 13, further comprising means for vertically moving said cancelling means and a bracket mounted on a base plate of said apparatus for guiding said cancelling means during its vertical movement.

15. An information input/output apparatus for a disk film according to claim 12, wherein said cancelling means is provided with an insertion shaft for raising said disk film after being inserted into a hub bore in said disk film.

16. An information input/output apparatus for a disk film according to claim 15, wherein the insertion shaft of said cancelling means is provided with a key projecting therefrom, said key being adapted to be inserted into a key groove which is provided on said disk film such as to communicate with said hub bore, in order to prevent rotation of said disk film as it is raised by said insertion shaft.

17. An information input/output apparatus for a disk film according to claim 12, further comprising means for raising said lifting means higher than said cancelling means, to thereby allow raising said disk film.

18. An information input/output apparatus for a disk film according to claim 12, further comprising means for causing said lifting means to be raised together with said cancelling means half of the full extent of the ascending distance and for further raising said lifting means after the rise of said cancelling means is terminated, to thereby allow raising said disk film.

19. An information input/output apparatus for a disk film according to claim 18, further comprising means, including corresponding cams which rotate together, for causing said cancelling means and said lifting means to be simultaneously raised half of the full extent of the ascending distance, said cams having different lifts to thereby cause said lifting means to be raised alone after the rise of said cancelling means is terminated.

20. An information input/output apparatus for a disk film according to claim 12, wherein said lifting means has a tubular upper end portion, and bearings rotatably supported on the inner periphery of said tubular portion, said bearings being adapted to raise said disk film when rising.

21. An information input/output apparatus for a disk film according to claim 12, further comprising means for setting the ascending stroke of said lifting means such that said lifting means is raised until said disk film is allowed to come off the key of said insertion shaft by the rise of said cancelling means to thereby free the disk film for rotation.

22. An information input/output apparatus for a disk film used for effecting inputting and outputting of information in relation to the disk film in which a film disk is attached around a hub, said apparatus comprising:
   (a) a hollow moving table on which the peripheral edge of said disk film is mounted;
   (b) a retainer pawl which is pivotally supported by said moving table to press against said moving table such that when the peripheral edge of said disk film is mounted on said moving table said peripheral edge of said disk film is clamped between said retainer pawl and said moving table.
   (c) guide means which moves said moving table to predetermined stations; and
   (d) cancelling means which is provided at at least one of said stations to pivot said retainer pawl when rising, thereby cancelling the clamping of said disk film, whereby it is possible to simultaneously project all the image frames of said film disk in a projecting operation at a predetermined station.

23. An information input/output apparatus for a disk film according to claim 22, wherein said moving table consists of a disk which has a bore formed in the center thereof, said disk having a peripheral edge at said bore on which the peripheral edge of said disk film can be mounted.

24. An information input/output apparatus for a disk film according to claim 23, wherein said moving table is provided on the outer side of the peripheral edge of said bore with a taper portion which is gradually increased in wall thickness toward the outer peripheral side of said moving table such that said taper portion serves to guide the outer peripheral portion of said disk film as it is mounted thereon.

25. An information input/output apparatus for a disk film according to claim 22, further comprising means for futher raising said cancelling means after the clamping of said disk film is cancelled by pivoting said retainer pawl, to thereby allow raising said disk film.

26. An information input/output apparatus for a disk film according to claim 25, wherein said cancelling means has a resilient member interposed between the same and said retainer pawl, whereby, when said cancelling means rises more than a predetermined value, said retainer pawl is prevented from further pivoting by deflection of said resilient member.

27. An information input/output apparatus for a disk film according to claim 25, further comprising lifting means which is disposed at at least one of said stations and is able to rise independently of said cancelling means such as to raise said disk film when rising.

28. An information input/output apparatus for a disk film used for effecting inputting and outputting of information in relation to the disk film, said apparatus comprising:
   (a) a hollow moving table on which the peripheral edge of said disk film is mounted;
   (b) a retainer pawl which is pivotally supported by said moving table to press against said moving table such that when the peripheral edge portion of said disk film is mounted on said moving table said peripheral edge portion is clamped between said retainer pawl and said moving table;

(c) a film supply station including cancelling means which is vertically movable and engages with said retainer pawl when rising, thereby cancelling the retention of said disk film, and subsequently raising said disk film;

(d) an information processing station including cancelling means which is vertically movable and engages with said retainer pawl when rising, thereby cancelling the retention of said disk film, said information processing station further including lifting means which is vertically movable and raises said disk film after the retention of said disk film has been cancelled by said cancelling means;

(e) an inspection station which is provided with a bore for projecting the light from light-emitting means on a screen through said disk film on said moving table; and (f) guide means which moves said moving table to said stations, whereby it is possible to simultaneously project all the image frames of said disk film in a projecting operation at a predetermined station.

29. An information input/output apparatus for a disk film according to claim 28, wherein said moving table consists of a disk which has a bore formed in the center thereof, said disk having a peripheral edge at said bore on which the peripheral edge of said disk film can be mounted.

30. An information input/output apparatus for a disk film according to claim 29, wherein said moving table is provided on the outer side of the peripheral edge at said bore with a taper portion which is gradually increased in wall thickness toward the outer peripheral side of said moving table such that said taper portion serves to guide the outer peripheral portion of said disk film as it is mounted thereon.

31. An information input/output apparatus for a disk film according to claim 28, further comprising means for preventing further pivoting of said retainer pawl by said cancelling means as it further rises after it has cancelled the clamping of said disk film by pivoting said retainer pawl.

32. An information input/output apparatus for a disk film according to claim 31, wherein said cancelling means has a resilient member interposed between the same and said retainer pawl, whereby, when said cancelling means rises more than a predetermined value, said retainer pawl is prevented from further pivoting by deflection of said resilient member.

33. An information input/output apparatus for a disk film according to claim 28, wherein said cancelling means includes an insertion shaft which is provided with a key projecting therefrom, said key being adapted to be inserted into a key groove which is provided on said disk film such as to communicate with a hub bore formed in said disk film, in order to prevent rotation of said disk film as it is raised by said insertion shaft.

34. An information input/output apparatus for a disk film according to claim 28, further comprising means for causing said lifting means to be raised together with said cancelling means half of the full extent of the ascending distance and for further raising said lifting means after the rise of said cancelling means is terminated, to thereby allow raising said disk film.

* * * * *